United States Patent
Yang et al.

(10) Patent No.: US 11,115,963 B2
(45) Date of Patent: Sep. 7, 2021

(54) METHOD AND DEVICE FOR MULTIPLEXING UPLINK GRANT RESOURCES

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/506,511

(22) Filed: Jul. 9, 2019

(65) Prior Publication Data

US 2019/0335451 A1 Oct. 31, 2019

Related U.S. Application Data

(63) Continuation of application No. PCT/CN2017/070633, filed on Jan. 9, 2017.

(51) Int. Cl.
*H04W 72/04* (2009.01)
*H04W 72/10* (2009.01)
(Continued)

(52) U.S. Cl.
CPC ..... *H04W 72/0413* (2013.01); *H04W 72/048* (2013.01); *H04W 72/10* (2013.01);
(Continued)

(58) Field of Classification Search
None
See application file for complete search history.

(56) References Cited

U.S. PATENT DOCUMENTS

2016/0227574 A1 8/2016 Raina et al.
2017/0318594 A1* 11/2017 Babaei ............... H04W 72/087

FOREIGN PATENT DOCUMENTS

AU 2015264604 A1 11/2016
CN 102111808 A 6/2011
(Continued)

OTHER PUBLICATIONS

Extended European Search Report dated Nov. 20, 2019; Appln. No. 17889821.9.
(Continued)

*Primary Examiner* — Yaotang Wang
(74) *Attorney, Agent, or Firm* — Ladas & Parry LLP

(57) ABSTRACT

The present application provides a method and device for multiplexing uplink grant resources, including: determining, by a network device, control information, where the control information includes uplink grant resources information and multiplexing manner information, where the uplink grant resources information is used for indicating uplink grant resources configured by the network device for a terminal device, the multiplexing manner information is used for indicating a multiplexing manner of remaining uplink grant resources, and the remaining uplink grant resources are uplink grant resources in the uplink grant resources except a part of uplink grant resources used for carrying data in one or more logical channels corresponding to the uplink grant resources; and transmitting, by the network device, the control information to the terminal device. The method for multiplexing uplink grant resources of the present application can improve a use efficiency of uplink grant resources.

29 Claims, 5 Drawing Sheets

(51) Int. Cl.
*H04W 72/12* (2009.01)
*H04W 72/14* (2009.01)
*H04W 80/08* (2009.01)

(52) U.S. Cl.
CPC ... *H04W 72/1247* (2013.01); *H04W 72/1268* (2013.01); *H04W 72/14* (2013.01); *H04W 80/08* (2013.01)

(56) References Cited

FOREIGN PATENT DOCUMENTS

| | | |
|---|---|---|
| CN | 104113926 A | 10/2014 |
| CN | 102036390 B | 12/2014 |
| CN | 102149206 B | 1/2016 |
| CN | 108024381 A | 5/2016 |
| CN | 107820319 A | 3/2018 |
| CN | 107889264 A | 4/2018 |
| RU | 2476026 C2 | 2/2013 |
| WO | 2016126346 A1 | 8/2016 |

OTHER PUBLICATIONS

Ericsson:"Impacts on the UL grant and LCP of different numerologies and flexible TTI" R2-168659 (3GPP); Mobile Competence Centre; 650, Route Des Lucioles; F-06; vol. RAN WG2, No. Reno, Nevada, USA; Nov. 14, 2016-Nov. 18, 2016; Nov. 5, 2016; XP051193157.
Interdigital Communications: "LCP and Scheduling Aspects for Multiple Numerologies", R2-1700236 (3GPP); Mobile Competence Centre; 650, Route Des Lucioles; F-06921 Sophi, vol. RAN WG2, No. Spokane, WA; Jan. 17, 2017-Jan. 19, 2017; Jan. 6, 2017; XP051203773.
Samsung:"Logical Channel Prioritization Considering Multiple Numerologies and/or TTIs" R2-168040 (3GPP); Mobile Competence Centre; 650, Route Des Lucioles; F-06921 Sophia-Antipolis Cedex; France; vol. RAN WG2, No. Reno, USA; Nov. 14, 2016-Nov. 18, 2016; Nov. 4, 2016; XP051192336.
Huawei et al:"LCP with Multiple Numerologies", R2-167575 (3GPP); Mobile Competence Centre; 650, Route Des Lucioles; F-06921 Sophia-Antipolis Cedex; France; vol. RAN WG2, No. Reno, Nevada, US; Nov. 14, 2016-Nov. 18, 2016; Nov. 5, 2016; XP051192791.
OPPO, 3GPP TSG-RAN WG2 NR Ad Hoc R2-1700049, Logical channel multiplexing and prioritization in NR, published on Jan. 6, 2017.
The First Office Action of corresponding Chinese application No. 201780082863.X, dated Mar. 18, 2020.
The first Office Action of corresponding Russian application No. 2019125240, dated May 12, 2020.
3GPP TSG-RAN WG2 #95bis Tdoc R2-166817: MAC impacts of different numerologies and flexible TTI duration, Kaohsiung, Taiwan. Oct. 10-14, 2016.
The second Office Action of corresponding, Chinese application No. 201780082863.X, dated Jul. 17, 2020.
The first Office Action of corresponding Canadian application No. 3049699, dated Sep. 21, 2020.
The first Office Action of corresponding Chilean application No. 201901896, dated Sep. 30, 2020.
The first Office Action of corresponding Japanese application No. 2019-537256, dated Jan. 19, 2021.
Huawei, HiSilicon, UL scheduling enhancement in NR [online], 3GPP TSG RAN WG2 adhoc_2017_01_NR, R2-1700175, Jan. 7, 2017, Internet<URL:http://www.3gpp.org/ftp/tsg_ran/WG2_RL2/TSGR2_AHs/2017_01_NR/Docs/R2-1700175.zip>.
The first Office Action of corresponding Indian application No. 201917030065, dated Jan. 28, 2021.
The Notice of Rejection of corresponding Chinese application No. 201780082863.X, dated Feb. 3, 2021.
The first Office Action of corresponding Taiwan application No. 107100443, dated Apr. 13, 2021.

* cited by examiner

100

| A network device determines control information, where the control information includes uplink grant resources information and multiplexing manner information, where the uplink grant resources information is used for indicating uplink grant resources configured by the network device for a terminal device, the multiplexing manner information is used for indicating a multiplexing manner of remaining uplink grant resources, and the remaining uplink grant resources are uplink grant resources in the uplink grant resources except a part of uplink grant resources used for carrying data in one or more logical channels corresponding to the uplink grant resources | ～S110 |

| The network device transmits the control information to the terminal device | ～S120 |

```
┌─────────────────────────────────────────────────┐
│ The network device receives a resource scheduling request │
│ transmitted by a terminal device, where the resource scheduling │
│ request is used for indicating a data amount of data to be │ ～ S130
│ transmitted of the terminal device and a logical channel │
│ carrying the data to be transmitted │
└─────────────────────────────────────────────────┘
                        │
┌─────────────────────────────────────────────────┐
│ The network device determines the uplink grant resources │
│ according to the data amount and a service feature of the logical │ ～ S140
│ channel carrying the data to be transmitted │
└─────────────────────────────────────────────────┘
                        │
┌─────────────────────────────────────────────────┐
│ The network device determines control information, │
│ where the control information includes uplink grant resources │
│ information and multiplexing manner information, where │
│ the uplink grant resources information is used for indicating │
│ uplink grant resources configured by the network device for a │
│ terminal device, the multiplexing manner information is used │ ～ S110
│ for indicating a multiplexing manner of remaining uplink grant │
│ resources, and the remaining uplink grant resources are uplink │
│ grant resources in the uplink grant resources except a part of │
│ uplink grant resources used for carrying data in one or more │
│ logical channels corresponding to the uplink grant resources │
└─────────────────────────────────────────────────┘
                        │
┌─────────────────────────────────────────────────┐
│ The network device transmits the control │ ～ S120
│ information to the terminal device │
└─────────────────────────────────────────────────┘
```

The terminal device receives control information transmitted by a network device, where the control information includes uplink grant resources information, where the uplink grant resources information is used for indicating uplink grant resources configured by the network device for the terminal device  ~ S210

The terminal device determines a multiplexing manner of remaining uplink grant resources, where the remaining uplink grant resources are uplink grant resources in the uplink grant resources except a part of uplink grant resources used for carrying data in one or more logical channels corresponding to the uplink grant resources  ~ S220

The terminal device multiplexes the remaining uplink grant resources according to the multiplexing manner  ~ S230

FIG. 3

METHOD AND DEVICE FOR MULTIPLEXING UPLINK GRANT RESOURCES

CROSS-REFERENCE TO RELATED APPLICATIONS

This application is a continuation of International Application No. PCT/CN2017/070633 filed on Jan. 9, 2017, the content of which is incorporated herein by reference in its entirety.

TECHNICAL FIELD

Embodiments of the present application relate to the field of communications, and more particularly, to a method and device for multiplexing uplink grant resources.

BACKGROUND

In an existing long term revolution (LTE) system, after a network side configures an uplink grant (Uplink Grant) resource for a terminal equipment (User Equipment, "UE" for short), the terminal device multiplexes the uplink grant resources according to priorities of all logical channels.

In a new radio (NR) system, a plurality of numerologies (numerology) are introduced, and each logical channel may be mapped to a certain type or a certain group of numerologies, so that uplink grant resources corresponding to a certain type of numerology can only be used by a certain logic channel or a certain group of logic channels corresponding to that numerology, and other logic channels cannot use that uplink grant resources, thereby resulting in a waste of the uplink grant resources.

SUMMARY

The present application provides a method and a device for multiplexing uplink grant resources, which can improve a use efficiency of uplink grant resources.

A first aspect provides a method for multiplexing uplink grant resources, including: determining, by a network device, control information, where the control information includes uplink grant resources information and multiplexing manner information, where, the uplink grant resources information is used for indicating uplink grant resources configured by the network device for a terminal device, the multiplexing manner information is used for indicating a multiplexing manner of remaining uplink grant resources, and the remaining uplink grant resources are uplink grant resources in the uplink grant resources except a part of uplink grant resources used for carrying data in one or more logical channels corresponding to the uplink grant resources; and transmitting, by the network device, the control information to the terminal device.

In the method for multiplexing uplink grant resources according to the present application, the control information transmitted by the network device to the terminal device includes multiplexing manner information, so that the terminal device can determine the multiplexing manner of the remaining uplink grant resources in the configured uplink grant resources according to the multiplexing manner information, and multiplex the remaining uplink grant resources according to the determined multiplexing manner. Therefore, the use efficiency of uplink grant resources can be improved.

In combination with the first aspect, in an implementation of the first aspect, before the determining, by a network device, control information, the method further includes: receiving, by the network device, a resource scheduling request transmitted by the terminal device, where the resource scheduling request is used for indicating a data amount of data to be transmitted of the terminal device and a logical channel carrying the data to be transmitted; and determining, by the network device, the uplink grant resources according to the data amount and a service feature of the logical channel carrying the data to be transmitted.

In combination with the first aspect and the above implementation thereof, in another implementation of the first aspect, the multiplexing manner includes at least one of the following manners: a global logical channel multiplexing manner, a partial logical channel multiplexing manner and an undefined logical channel multiplexing manner.

It should be noted that, the global logical channel multiplexing manner refers to that the terminal device multiplexes the remaining uplink grant resources for all logical channels with a service carried thereon according to a specific priority order. The partial logical channel multiplexing manner refers to that the terminal device multiplex the remaining uplink grant resources for a logical channel specified by the network device according to a specific priority order. The undefined logical channel multiplexing manner refers to that the terminal device may voluntarily determine the logical channel that multiplex the remaining uplink grant resources in real time according to the implementation.

In combination with the first aspect and the above implementation thereof, in another implementation of the first aspect, the method further includes: transmitting, by the network device, priority indication information to the terminal device, where the priority indication information is used for the terminal device to determine a priority for each logical channel of a target logical channel to multiplex the remaining uplink grant resources, and the target logical channel is a logical channel that can multiplex the remaining uplink grant resources.

In combination with the first aspect and the above implementation thereof, in another implementation of the first aspect, the priority indication information is also used for the terminal device to determine priorities that different data packets in the each logical channel multiplex the remaining uplink grant resources.

In combination with the first aspect and the above implementation thereof, in another implementation of the first aspect, the priority indication information is used for indicating that the terminal device determines the priority for the each logical channel to multiplex the remaining uplink grant resources according to a service type of data that can be transmitted by a data radio bearer DRB corresponding to the each logical channel; or, the priority indication information is used for indicating that the terminal device determines the priority for the each logical channel to multiplex the remaining uplink grant resources according to a parameter configured by high layer signaling; or, the priority indication information is used for indicating the priority for the each logical channel to multiplex the remaining uplink grant resources.

In combination with the first aspect and the above implementation thereof, in another implementation of the first aspect, the parameter configured by the high layer signaling includes at least one of the following parameters: a priority level, a prioritized bit rate PBR and a bucket size duration BSD.

A second aspect provides a method for multiplexing uplink grant resources, including: receiving, by a terminal device, control information transmitted by a network device, where the control information includes uplink grant resources information, and the uplink grant resources information is used for indicating uplink grant resources configured by the network device for the terminal device; determining, by the terminal device, a multiplexing manner of remaining uplink grant resources, where the remaining uplink grant resources are uplink grant resources in the uplink grant resources except a part of uplink grant resources used for carrying data in one or more logical channels corresponding to the uplink grant resources; and multiplexing, by the terminal device, the remaining uplink grant resources according to the multiplexing manner.

In the method for multiplexing uplink grant resources according to the present application, the control information that is received by the terminal device and transmitted by the network device includes uplink grant resources information, and the terminal device determines the uplink grant resources configured by the network device for the terminal device according to the uplink grant resources information, determines the multiplexing manner of the remaining uplink grant resources in the uplink grant resources, and multiplexes the remaining uplink grant resources according to the multiplexing manner of the remaining uplink grant resources. Therefore, the use efficiency of uplink grant resources can be improved.

In combination with the second aspect, in an implementation of the second aspect, the method further includes: transmitting, by the terminal device, a resource scheduling request to the network device before receiving the control information, where the resource scheduling request is used for indicating a data amount of data to be transmitted of the terminal device and a logical channel carrying the data to be transmitted.

In combination with the second aspect and the above implementation thereof, in another implementation of the second aspect, the control information includes multiplexing manner information, and the multiplexing manner information is used for indicating a multiplexing manner of the remaining uplink grant resources;

where, the determining, by the terminal device, a multiplexing manner of remaining uplink grant resources include: determining, by the terminal device, a multiplexing manner of the remaining uplink grant resources according to the multiplexing manner information.

In combination with the second aspect and the above implementation thereof, in another implementation of the second aspect, the multiplexing manner includes at least one of the following manners: a global logical channel multiplexing manner, a partial logical channel multiplexing manner and an undefined logical channel multiplexing manner.

In combination with the second aspect and the above implementation thereof, in another implementation of the second aspect, the multiplexing, by the terminal device, the remaining uplink grant resources according to the multiplexing manner includes: determining, by the terminal device, one or more target logical channels according to the multiplexing manner, where the target logical channel is a logical channel that can multiplex the remaining uplink grant resources; determining, by the terminal device, a priority for each logical channel of the target logical channel to multiplex the remaining uplink grant resources; multiplexing, by the terminal device, the remaining uplink grant resources according to the priority for the each logical channel to multiplex the remaining uplink grant resources.

In combination with the second aspect and the above implementation thereof, in another implementation of the second aspect, the method further includes: receiving, by the terminal device, priority indication information transmitted by the network device, where the priority indication information is used for the terminal device to determine the priority for the each logical channel to multiplex the remaining uplink grant resources;

where, the determining, by the terminal device, a priority for each channel of the target logical channel to multiplex the remaining uplink grant resources include: determining, by the terminal device, the priority for the each logical channel to multiplex the remaining uplink grant resources according to the priority indication information.

In combination with the second aspect and the above implementation thereof, in another implementation of the second aspect, the priority indication information is also used for the terminal device to determine priorities that different data packets in the each logical channel multiplex the remaining uplink grant resources, and the method further includes: determining, by the terminal device, the priorities that different data packets in the each logical channel multiplex the remaining uplink grant resources according to the priority indication information;

where, the multiplexing, by the terminal device, the remaining uplink grant resources according to the priority for the each logical channel to multiplex the remaining uplink grant resources include: multiplexing, by the terminal device, the remaining uplink grant resources according to the priority for the each logical channel to multiplex the remaining uplink grant resources and the priorities that different data packets in the each logical channel multiplex the remaining uplink grant resources.

In combination with the second aspect and the above implementation thereof, in another implementation of the second aspect, the priority indication information is used for indicating that the terminal device determines the priority for the each logical channel to multiplex the remaining uplink grant resources according to a service type of data that can be transmitted by a data radio bearer DRB corresponding to the each logical channel; or, the priority indication information is used for indicating that the terminal device determines the priority for the each logical channel to multiplex the remaining uplink grant resources according to a parameter configured by high layer signaling; or, the priority indication information is used for indicating the priority for the each logical channel to multiplex the remaining uplink grant resources.

In combination with the second aspect and the above implementation thereof, in another implementation of the second aspect, the parameter configured by the high layer signaling includes at least one of the following parameters: a priority level, a prioritized bit rate PBR and a bucket size duration BSD.

A third aspect provides a network device, configured to perform the method of the first aspect or any of the possible implementations of the first aspect described above. Specifically, the network device includes a functional module configured to perform the method of the first aspect or any of the possible implementations of the first aspect described above.

A fourth aspect provides a terminal device, configured to perform the method of the second aspect or any of the possible implementations of the second aspect described above. Specifically, the terminal device includes a functional module configured to perform the method of the second aspect or any of the possible implementations of the second aspect described above.

A fifth aspect provides a network device, including a processor, a memory, a transceiver. The processor, the memory and the transceiver communicate with each other, transfer a control and/or data signal to each other via internal connection path, so that the network device performs the method of the first aspect or any of the possible implementations of the first aspect described above.

A sixth aspect provides a terminal device, including a processor, a memory, a transceiver. The processor, the memory and the transceiver communicate with each other, transfer a control and/or data signal to each other via internal connection path, so that the terminal device performs the method of the second aspect or any of the possible implementations of the second aspect described above.

A seventh aspect provides a computer readable medium, configured to store a computer program, where the computer program includes an instruction for performing the method of the first aspect or any of the possible implementations of the first aspect described above.

A eighth aspect provides a computer readable medium, configured to store a computer program, where the computer program includes an instruction for performing the method of the second aspect or any of the possible implementations of the second aspect described above.

BRIEF DESCRIPTION OF DRAWINGS

FIG. 1 is a schematic flowchart of a method for multiplexing uplink grant resources according to an embodiment of the present application;

FIG. 2 is another schematic flowchart of a method for multiplexing uplink grant resources according to an embodiment of the present application;

FIG. 3 is a schematic flowchart of a method for multiplexing uplink grant resources according to another embodiment of the present application;

DESCRIPTION OF EMBODIMENTS

Figure 4:
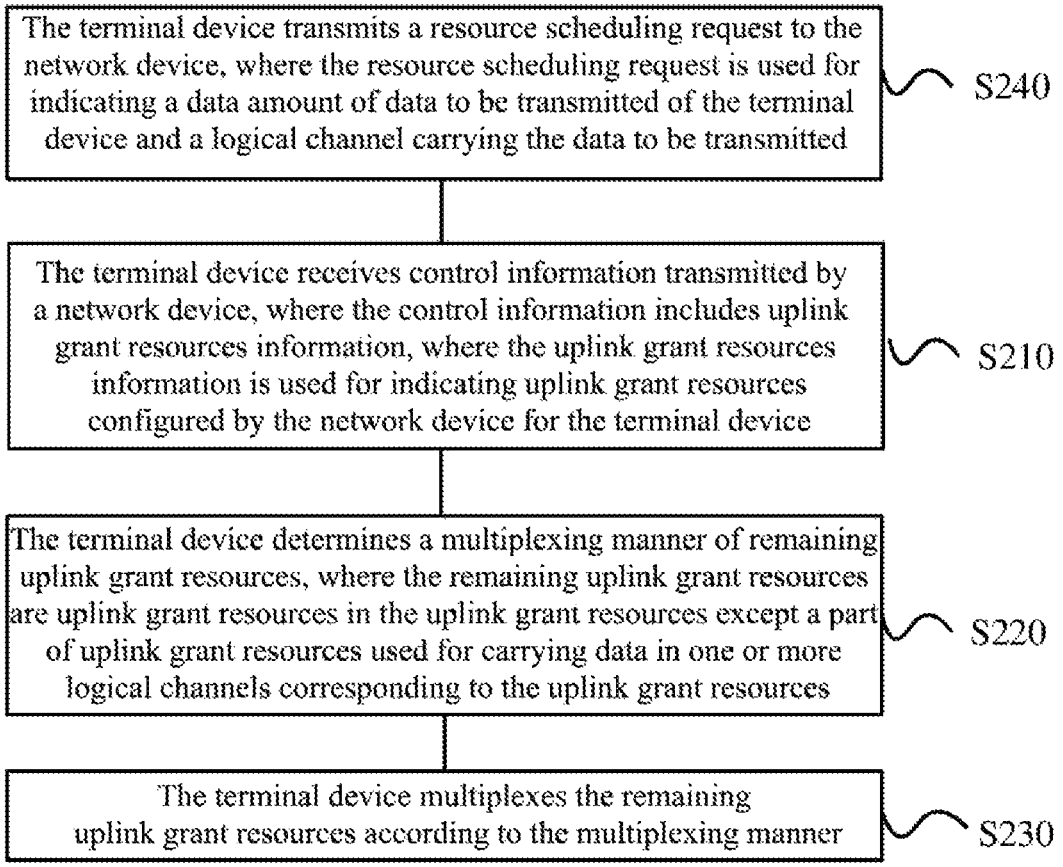
FIG. 4 is another schematic flowchart of a method for multiplexing uplink grant resources according to another embodiment of the present application.

Technical solutions in embodiments of the present application will be clearly and completely described in the following with reference to the accompanying drawings in the embodiments of the present application.

It should be understood that, the technical solutions of the embodiments of the present application can be applied to various communication systems, for example, a global system of mobile communication (GSM) system, a code division multiple access (CDMA) system, a wideband code division multiple access (WCDMA) system, a general packet radio service (GPRS), a long term evolution (LTE) system, a LTE frequency division duplex (FDD) system, a LTE time division duplex (TDD), a universal mobile telecommunication system (UMTS) or a worldwide interoperability for microwave access (WiMAX) communication system, a 5G system, or a new radio (NR) system.

In the embodiments of the present application, a terminal device may include, but is not limited to, a mobile station (MS), a mobile terminal, a mobile telephone, a user equipment (UE), a handset, a portable equipment, a vehicle, etc. The terminal device can communicate with one or more core networks via a radio access network (RAN), for example, the terminal device may be a mobile phone (or referred to as a "cellular" phone), a computer with a wireless communication capability, etc. The terminal device may also be a portable, pocket-sized, handheld, computer-integrated or in-vehicle mobile apparatus.

The network device involved in the embodiments of the present application is an apparatus deployed in a radio access network to provide a wireless communication function for the terminal device. The network device may be a base station, and the base station may include various forms of a macro base station, a micro base station, a relay station, an access point, etc. In systems with different radio access technologies, the names of devices with base station function may vary. For example, the evolved NodeB (Evolved NodeB, "eNB" or "eNodeB" for short) is called in the LTE network, and Node B is called in the 3rd Generation ("3G" for short) network, and the like.

FIG. 1 illustrates a method for multiplexing uplink grant resources according to an embodiment of the present application. As shown in FIG. 1, a method 100 includes:

S110, a network device determines control information, where the control information includes uplink grant resources information and multiplexing manner information, where the uplink grant resources information is used for indicating uplink grant resources configured by the network device for a terminal device, the multiplexing manner information is used for indicating a multiplexing manner of remaining uplink grant resources, and the remaining uplink grant resources are uplink grant resources in the uplink grant resources except a part of uplink grant resources used for carrying data in one or more logical channels corresponding to the uplink grant resources; and S120, the network device transmits the control information to the terminal device.

It can be understood that, in S110, the uplink grant resources configured by the network device for the terminal device may correspond to a numerology of a specific numerology in physical layer, or correspond to various numerologies. The terminal device firstly multiplexes the uplink grant resources for logical channels related to the above-mentioned specific numerology or various numerologies according to a priority order, in order to preferentially satisfy quality of service (QoS) requirements of these channels.

And when the data amount of data to be transmitted carried on the logical channel(s) related to the numerology corresponding to the uplink grant resources does not fill up the uplink grant resources, there will be a surplus of the uplink grant resources, which is the remaining uplink grant resources mentioned above. In this case, the terminal device may determine a multiplexing manner of the remaining uplink grant resources according to the multiplexing manner information, and multiplex the uplink grant resources according to the determined multiplexing manner, which avoids a waste of the uplink grant resources, and improves the utilization rate of the uplink grant resources.

In the embodiment of the present application, as shown in FIG. 2, the method 100 further includes:

S130, the network device receives a resource scheduling request transmitted by the terminal device, where the resource scheduling request is used for indicating a data amount of data to be transmitted of the terminal device and a logical channel carrying the data to be transmitted.

S140, the network device determines the uplink grant resources according to the data amount and a service feature of the logical channel carrying the data to be transmitted.

In some embodiments, the resource scheduling request is a buffer status report (BSR). The service feature of the logical channel includes, but is not limited to, a QoS requirement.

In the embodiment of the present application, the multiplexing manner includes at least one of the following manners: a global logical channel multiplexing manner, a partial logical channel multiplexing manner and an undefined logical channel multiplexing manner.

It should be noted that, the global logical channel multiplexing manner refers to that the terminal device may multiplex the remaining uplink grant resources for all logical channels with a service carried thereon according to a specific priority order. The partial logical channel multiplexing manner refers to that the terminal device multiplex the remaining uplink grant resources for some logical channels specified by the network device according to a specific priority order. Herein, the network device may configure the remaining uplink grant resources to correspond to one or multiple numerologies. If the remaining uplink grant resources are configured to correspond to one numerology, then only the logical channel corresponding to that numerology can multiplex the remaining uplink grant resources, and this kind of multiplexing manner is also called "specific logic channel multiplexing manner"; If the remaining uplink grant resources are configured to correspond to multiple numerologies, then all of the logical channels corresponding to that multiple numerologies can multiplex the remaining uplink grant resources.

And the corresponding relationship between the numerology and the logical channel may be configured by the network device dynamically or semi-statically, which is not limited by the embodiments of the present application.

In the above embodiments, the priority order may be determined by the terminal device according to a preset ordering rule, or determined by the terminal device according to priority indication information transmitted by the network device.

Specifically, in some embodiments, the network device transmits the priority indication information to the terminal device, where the priority indication information is used for the terminal device to determine a priority for each logical channel of a target logical channel to multiplex the remaining uplink grant resources, and the target logical channel is a logical channel that can multiplex the remaining uplink grant resources.

For example, the priority indication information indicates that the terminal device determines the priority for the each logical channel to multiplex the remaining uplink grant resources according to a service type of data that can be transmitted by a data radio bearer (DRB) corresponding to the each logical channel. For example, a sequence order of the priority corresponding to different service types may be pre-configured, and the terminal device determines the priority of logical channel according to the service types of data that can be transmitted by DRB corresponding to the logical channel. For example, assuming that a priority of the session-type service is higher than a priority of the traffic-type service and is higher than a priority of interaction-type service, and there are three logical channels that can multiplex the remaining uplink grant resources, which respectively are a logical channel 1, a logical channel 2, and a logical channel 3. And service types of the data that the corresponding DRB can transmit respectively are an interaction-type, a session-type and a traffic-type, thus, the priorities that these three logical channels multiplex the remaining uplink grant resources from high to low are: the logical channel 2, the logical channel 3, and the logical channel 1.

Or, the priority indication information indicates that the terminal device determines the priority for the each logical channel to multiplex the remaining uplink grant resources according to a parameter configured by high layer signaling. The parameter configured by high layer signaling includes, but is not limited to: a priority (Priority) level, a prioritized bit rate (PBR) and a bucket size duration (BSD).

Or, the priority indication information indicates the priority for the each logical channel to multiplex the remaining uplink grant resources. For example, assuming that there are three logical channels that can multiplex the remaining uplink grant resources, which respectively are a logical channel 1, a logical channel 2, and a logical channel 3, and the network device, through the priority indication information, may directly indicates that the priorities that these three logical channels multiplex the remaining uplink grant resources from high to low in sequence are: the logical channel 3, the logical channel 2, and the logical channel 1.

Further, the priority indication information is also used for the terminal device to determine priorities that different data packets in the each logical channel multiplex the remaining uplink grant resources. For example, the priority indication information indicates that the terminal device performs the priority ordering on data packets with different QoS-Flow-IDs corresponding to a same logical channel, and specifies that a data packet with a greater ID value has a higher priority. Then, the terminal device determines the priorities that data packets with different IDs multiplex the remaining uplink grant resources according to the ordering rule, that is, an order in which the data packets with different IDs are transmitted.

In an embodiment, the priority indication information may be included in the control information, or the priority indication information may be separate information.

The method for multiplexing uplink grant resources according to the embodiment of the present application is described in detail from the perspective of the network device side with reference to FIG. 1 and FIG. 2, and a method for multiplexing uplink grant resources according to another embodiment of the present application will be described in detail from the perspective of the terminal device side with reference to FIG. 3 and FIG. 4. It should be noted that, the interaction between the terminal device and the network device described from the perspective of the terminal device side is the same as that described from the perspective of the network device side. To avoid repetition, the related description is omitted as appropriate.

FIG. 3 is a method for multiplexing uplink grant resources according to another embodiment of the present application, as shown in FIG. 3, a method 200 includes:

S210, a terminal device receives control information transmitted by a network device, where the control information includes uplink grant resources information, where the uplink grant resources information is used for indicating uplink grant resources configured by the network device for the terminal device; and S220, the terminal device determines a multiplexing manner of remaining uplink grant resources, where the remaining uplink grant resources are uplink grant resources in the uplink grant resources except a part of uplink grant resources used for carrying data in one or more logical channels corresponding to the uplink grant resources;

S230, the terminal device multiplexes the remaining uplink grant resources according to the multiplexing manner.

As a result, in the method for multiplexing uplink grant resources according to the embodiment of the present application, the control information that is received by the terminal device and transmitted by the network device includes uplink grant resources information, and the terminal device determines the uplink grant resources configured by the network device for the terminal device according to the uplink grant resources information, determines the multiplexing manner of the remaining uplink grant resources in the uplink grant resources, and multiplexes the remaining uplink grant resources according to the multiplexing manner of the remaining uplink grant resources. Therefore, the use efficiency of uplink grant resources can be improved.

In an embodiment, in S220, the terminal device may determine the multiplexing manner of the remaining uplink grant resources by itself.

In the embodiment of the present application, as shown in FIG. 4, the method further includes:

S240, the terminal device transmits a resource scheduling request to the network device before receiving the control information, where the resource scheduling request is used for indicating a data amount of data to be transmitted of the terminal device and a logical channel carrying the data to be transmitted.

In the embodiment of the present application, the control information includes multiplexing manner information, where the multiplexing manner information is used for indicating a multiplexing manner of the remaining uplink grant resources;

where, S230 specifically is: the terminal device determines a multiplexing manner of the remaining uplink grant resources according to the multiplexing manner information.

In the embodiment of the present application, the multiplexing manner includes at least one of the following manners: a global logical channel multiplexing manner, a partial logical channel multiplexing manner and an undefined logical channel multiplexing manner.

In the embodiment of the present application, S230 specifically is: the terminal device determines one or more target logical channels according to the multiplexing manner, where the target logical channel is a logical channel that can multiplex the remaining uplink grant resources; the terminal device determines a priority for each logical channel of the target logical channel to multiplex the remaining uplink grant resources; the terminal device multiplexes the remaining uplink grant resources according to the priority for the each logical channel to multiplex the remaining uplink grant resources.

In the embodiment of the present application, the method further includes: the terminal device receives priority indication information transmitted by the network device, where the priority indication information is used for the terminal device to determine the priority for the each logical channel to multiplex the remaining uplink grant resources;

where, in S230, the terminal device determines a priority for each channel of the target logical channel to multiplex the remaining uplink grant resources include: the terminal device determines the priority that the each channel multiplexes the remaining uplink grant resources according to the priority indication information.

In the embodiment of the present application, the priority indication information is also used for the terminal device to determine priorities that different data packets in the each logical channel multiplex the remaining uplink grant resources, and the method further includes:

the terminal device determines the priorities that different data packets in the each logical channel multiplex the remaining uplink grant resources according to the priority indication information;

where, in S230, the terminal device multiplexes the remaining uplink grant resources according to the priority for the each logical channel to multiplex the remaining uplink grant resources include: the terminal device multiplexes the remaining uplink grant resources according to the priority for the each logical channel to multiplex the remaining uplink grant resources and the priorities that different data packets in the each logical channel multiplex the remaining uplink grant resources.

In the embodiment of the present application, the priority indication information is used for indicating that the terminal device determines the priority for the each logical channel to multiplex the remaining uplink grant resources according to a service type of data that can be transmitted by a data radio bearer DRB corresponding to the each logical channel; or, the priority indication information is used for indicating that the terminal device determines the priority for the each logical channel to multiplex the remaining uplink grant resources according to a parameter configured by high layer signaling; or, the priority indication information is used for indicating the priority for the each logical channel to multiplex the remaining uplink grant resources.

In the embodiment of the present application, the parameter configured by the high layer signaling includes at least one of the following parameters: a priority level, a prioritized bit rate PBR and a bucket size duration BSD.

Figure 5:
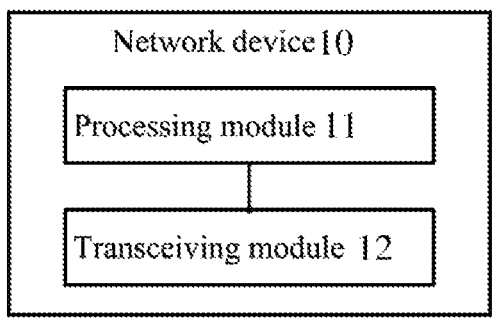
FIG. 5 is a schematic block diagram of a network device according to an embodiment of the present application.

The method for multiplexing uplink grant resources according to the embodiment of the present application is described in detail with reference to FIG. 1 to FIG. 4, and the network device according to the embodiment of the present application will be described with reference to FIG. 5, as shown in FIG. 5, a network device 10 includes:

a processing module 11, configured to determine control information, where the control information includes uplink grant resources information and multiplexing manner information, where the uplink grant resources information is used for indicating uplink grant resources configured by the network device for a terminal device, the multiplexing manner information is used for indicating a multiplexing manner of remaining uplink grant resources, and the remaining uplink grant resources are uplink grant resources in the uplink grant resources except a part of uplink grant resources used for carrying data in one or more logical channels corresponding to the uplink grant resources; and a transceiving module 12, configured to transmit the control information to the terminal device.

As a result, the control information transmitted by the network device according to the embodiment of the present application to the terminal device includes multiplexing manner information, so that the terminal device can determine the multiplexing manner of the remaining uplink grant resources in the configured uplink grant resources according to the multiplexing manner information, and multiplex the remaining uplink grant resources according to the determined multiplexing manner. Therefore, the use efficiency of uplink grant resources can be improved.

In the embodiment of the present application, before the processing module 11 determines control information, the transceiving module 12 is further configured to: receive a resource scheduling request transmitted by the terminal device, where the resource scheduling request is used for indicating a data amount of data to be transmitted of the terminal device and a logical channel carrying the data to be transmitted; and the processing module 11 is specifically configured to determine the uplink grant resources according to the data amount and a service feature of the logical channel carrying the data to be transmitted.

In the embodiment of the present application, the multiplexing manner includes at least one of the following manners: a global logical channel multiplexing manner, a partial logical channel multiplexing manner and an undefined logical channel multiplexing manner.

In the embodiment of the present application, the transceiving module 12 is further configured to: transmit priority indication information to the terminal device, where the priority indication information is used for the terminal device to determine a priority for each logical channel of a target logical channel to multiplex the remaining uplink grant resources, where the target logical channel is a logical channel that can multiplex the remaining uplink grant resources.

In the embodiment of the present application, the priority indication information is also used for the terminal device to determine priorities that different data packets in the each logical channel multiplex the remaining uplink grant resources.

In the embodiment of the present application, the priority indication information is used for indicating that the terminal device determines the priority for the each logical channel to multiplex the remaining uplink grant resources according to a service type of data that can be transmitted by a data radio bearer DRB corresponding to the each logical channel; or, the priority indication information is used for indicating that the terminal device determines the priority for the each logical channel to multiplex the remaining uplink grant resources according to a parameter configured by high layer signaling; or, the priority indication information is used for indicating the priority for the each logical channel to multiplex the remaining uplink grant resources.

In the embodiment of the present application, the parameter configured by the high layer signaling includes at least one of the following parameters: a priority level, a prioritized bit rate PBR and a bucket size duration BSD.

The network device according to the embodiment of the present application may refer to the process of the method 100 corresponding to the embodiment of the present application, and respective units/modules in the network device and other operations and/or functions described above are respectively used to implement the corresponding processes in the method 100, which will not be repeated herein for the purpose of simplicity.

Figure 6:
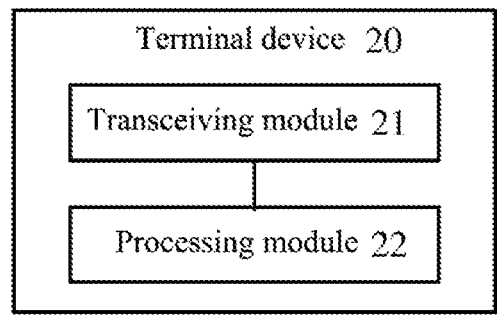
FIG. 6 is a schematic block diagram of a terminal device according to an embodiment of the present application.

FIG. 6 is a schematic block diagram of a terminal device according to an embodiment of the present application, as shown in FIG. 6, a terminal device 20 includes:

a transceiving module 21, configured to receive control information transmitted by a network device, where the control information includes uplink grant resources information, and the uplink grant resources information is used for indicating uplink grant resources configured by the network device for the terminal device;

a processing module 22, configured to determine a multiplexing manner of remaining uplink grant resources, where the remaining uplink grant resources are uplink grant resources in the uplink grant resources except a part of uplink grant resources used for carrying data in one or more logical channels corresponding to the uplink grant resources; and the processing module 22, further configured to multiplex the remaining uplink grant resources according to the multiplexing manner.

As a result, control information received by the terminal device and transmitted by the network device according to the embodiment of the present application includes uplink grant resources information, the terminal device determines the uplink grant resources configured by the network device for the terminal device according to the uplink grant resources information, determines the multiplexing manner of the remaining uplink grant resources in the uplink grant resources, and multiplexes the remaining uplink grant resources according to the multiplexing manner of the remaining uplink grant resources. Therefore, the use efficiency of uplink grant resources can be improved.

In the embodiment of the present application, the transceiving module 21 is further configured to:

transmit a resource scheduling request to the network device before the transceiving module 21 receives the control information transmitted by the network device, where the resource scheduling request is used for indicating a data amount of data to be transmitted of the terminal device and a logical channel carrying the data to be transmitted.

In the embodiment of the present application, the control information includes multiplexing manner information, where the multiplexing manner information is used for indicating a multiplexing manner of the remaining uplink grant resources;

where, the processing module 22 is specifically configured to:

determine a multiplexing manner of the remaining uplink grant resources according to the multiplexing manner information.

In the embodiment of the present application, the multiplexing manner includes at least one of the following manners: a global logical channel multiplexing manner, a partial logical channel multiplexing manner and an undefined logical channel multiplexing manner.

In the embodiment of the present application, the processing module 22 is specifically configured to:

determine one or more target logical channels according to the multiplexing manner, where the target logical channel is a logical channel that can multiplex the remaining uplink grant resources;

determine a priority for each logical channel of the target logical channel to multiplex the remaining uplink grant resources; and multiplex the remaining uplink grant resources according to the priority for the each logical channel to multiplex the remaining uplink grant resources.

In the embodiment of the present application, the transceiving module 21 is further configured to: receive priority indication information transmitted by the network device, where the priority indication information is used for the terminal device to determine the priority for the each logical channel to multiplex the remaining uplink grant resources;

where, the processing module 22 is specifically configured to:

determine the priority for the each logical channel to multiplex the remaining uplink grant resources according to the priority indication information.

In the embodiment of the present application, the priority indication information is also used for the terminal device to determine priorities that different data packets in the each logical channel multiplex the remaining uplink grant resources, the processing module 22 is specifically configured to:

determine the priorities that different data packets in the each logical channel multiplex the remaining uplink grant resources according to the priority indication information;

multiplex the remaining uplink grant resources according to the priority for the each logical channel to multiplex the remaining uplink grant resources and the priorities that different data packets in the each logical channel multiplex the remaining uplink grant resources.

In the embodiment of the present application, the priority indication information is used for indicating that the terminal device determines the priority for the each logical channel to multiplex the remaining uplink grant resources according to a service type of data that can be transmitted by a data radio bearer DRB corresponding to the each logical channel; or, the priority indication information is used for indicating that the terminal device determines the priority for the each logical channel to multiplex the remaining uplink grant resources according to a parameter configured by high layer signaling; or, the priority indication information is used for indicating the priority for the each logical channel to multiplex the remaining uplink grant resources.

In the embodiment of the present application, the parameter configured by the high layer signaling includes at least one of the following parameters: a priority level, a prioritized bit rate PBR and a bucket size duration BSD.

The terminal device according to the embodiment of the present application may refer to the process of the method 200 corresponding to the embodiment of the present application, and respective units/modules in the terminal device and other operations and/or functions described above are respectively used to implement the corresponding processes in the method 200, which will not be repeated herein for the purpose of simplicity.

Figure 7:
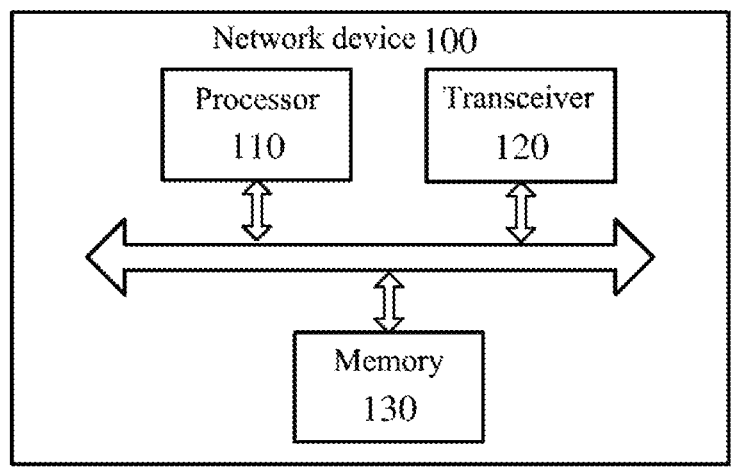
FIG. 7 is a schematic block diagram of a network device according to another embodiment of the present application.

FIG. 7 illustrates a network device according to another embodiment of the present application. As shown in FIG. 7, a network device 100 includes a processor 110 and a transceiver 120. The processor 110 and the transceiver 120 are connected to each other. In an embodiment, the network device 100 further includes a memory 130, wherein the memory 130 is connected to the processor 110. Where the processor 110, the memory 130, and the transceiver 120 can communicate with each other via an internal connection path. Where the processor 110 is configured to determine control information, and the control information includes uplink grant resources information and multiplexing manner information, where, the uplink grant resources information is used for indicating uplink grant resources configured by the network device for a terminal device, the multiplexing manner information is used for indicating a multiplexing manner of remaining uplink grant resources, and the remaining uplink grant resources are uplink grant resources in the uplink grant resources except a part of uplink grant resources used for carrying data in one or more logical channels corresponding to the uplink grant resources; and the transceiver 120 is configured to transmit the control information to the terminal device.

As a result, the control information transmitted by the network device to the terminal device according to the embodiment of the present application includes multiplexing manner information, so that the terminal device can determine the multiplexing manner of the remaining uplink grant resources in the configured uplink grant resources according to the multiplexing manner information, and multiplex the remaining uplink grant resources according to the determined multiplexing manner. Therefore, the use efficiency of uplink grant resources can be improved.

The network device 100 according to the embodiment of the present application may refer to the network device 10 corresponding to the embodiment of the present application, and respective units/modules in the network device and other operations and/or functions described above are respectively used to implement the corresponding processes in the method 100, which will not be repeated herein for the purpose of simplicity.

Figure 8:
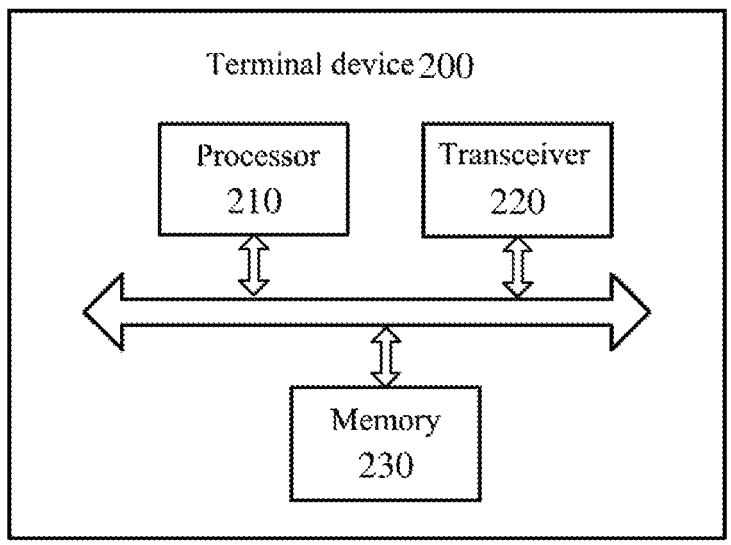
FIG. 8 is a schematic block diagram of a terminal device according to another embodiment of the present application.

FIG. 8 illustrate a schematic block diagram of a terminal device according to another embodiment of the present application, as shown in FIG. 8, a terminal device 200 includes: a processor 210 and a transceiver 220. The processor 210 and the transceiver 220 are connected to each other. In an embodiment, the terminal device 200 further includes a memory 230, where the memory 230 is connected to the processor 210. Where the processor 210, the memory 230, and the transceiver 220 communicate with each other via an internal connection path. Where the transceiver 220 is configured to receive control information transmitted by a network device, the control information includes uplink grant resources information, the uplink grant resources information is used for indicating uplink grant resources configured by the network device for the terminal device; the processor 210 is configured to determine a multiplexing manner of remaining uplink grant resources, where the remaining uplink grant resources are uplink grant resources in the uplink grant resources except a part of uplink grant resources used for carrying data in one or more logical channels corresponding to the uplink grant resources; and multiplex the remaining uplink grant resources according to the multiplexing manner.

As a result, the control information received by the terminal device and transmitted by the network device according to the embodiment of the present application includes uplink grant resources information, the terminal device determines the uplink grant resources configured by the network device for the terminal device according to the uplink grant resources information, determines the multiplexing manner of the remaining uplink grant resources in the uplink grant resources, and multiplexes the remaining uplink grant resources according to the multiplexing manner of the remaining uplink grant resources. Therefore, the use efficiency of uplink grant resources can be improved.

The terminal device 200 according to the embodiment of the present application may refer to the terminal device 20 corresponding to the embodiment of the present application, and respective units/modules in the terminal device and other operations and/or functions described above are respectively used to implement the corresponding processes in the method 200, which will not be repeated herein for the purpose of simplicity.

It can be understood that the processor in the embodiment of the present application may be an integrated circuit chip with signal processing capability. The processor described above may be a general-purpose processor, a digital signal processor (DSP), an application specific integrated circuit (ASIC), a field programmable gate array (FPGA), or other programming logic devices, a discrete gate or transistor logic device, a discrete hardware component. The methods, steps, and logical block diagrams disclosed in the embodiment of the present application can be implemented or executed. The general purpose processor may be a microprocessor or the processor may also be any conventional processor or the like.

The memory in the embodiment of the present application may be a volatile memory or a non-volatile memory, or may include both volatile and non-volatile memories. Where the non-volatile memory may be a read-only memory (ROM), a programmable read-only memory (Programmable ROM, PROM), an erasable programmable read-only memory (Erasable PROM, EPROM), or an electrically erase programmable read-only memory (Electrically EPROM, EEPROM) or a flash memory. The volatile memory may be a random access memory (RAM) that acts as an external cache. By way of example and not limitation, many forms of RAM may be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM) and a direct rambus random access memory (Direct Rambus RAM, DR RAM). It should be noted that the memories of the systems and methods described herein are intended to include, without being limited to, those and any other suitable types of memory.

Those of ordinary skill in the art will appreciate that the units and algorithm steps of the various examples described in combination with the embodiments disclosed herein can be implemented in electronic hardware or a combination of computer software and electronic hardware. Whether those functions are performed in a manner of hardware or software depends on a specific application and design constraint of the technical solutions. A person skilled in the art can use different methods to implement the described functions for each particular application, but such implementation should not be considered to go beyond the scope of the present application.

A person skilled in the art can clearly understand that for the convenience and simplicity of the description, the specific working process of the systems, the apparatuses and the units described above can refer to the corresponding process in the foregoing method embodiments, and details will not be described herein again.

In the several embodiments provided by the present application, it should be understood that the disclosed systems, apparatuses, and methods may be implemented in other manners. For example, the apparatus embodiments described above are merely illustrative. For example, the division of the units is only a logical function division. And in actual implementation, there may be other division manners, for example, multiple units or components may be combined or may be integrated into another system, or some features can be omitted or not be executed. In addition, the mutual coupling or direct coupling or communication connection shown or discussed may be indirect coupling or a communication connection via some interfaces, apparatuses or units, and may be in an electrical, mechanical or other form.

The units described as separate components may or may not be physically separated, and the components shown as units may or may not be physical units, that is, those components may be located in one place, or may be distributed to multiple network units. Some or all of the units may be selected according to actual needs to achieve the purpose of the solutions of the present embodiment.

In addition, various functional units in the respective embodiments of the present application may be integrated into one processing unit, or the various units may exist physically separately, or two or more units may be integrated into one unit.

The functions may be stored in a computer readable storage medium if implemented in the form of a software functional unit and sold or used as a standalone product. Based on such understanding, the technical solutions of the present application essentially, or its portion contributing to the prior art, or a portion of the technical solutions, may be embodied in the form of a software product, where the software product is stored in a storage medium including several instructions for causing a computer device (which may be a personal computer, a server, or a network device, etc.) to perform all or part of the steps of the methods described in the respective embodiments of the present application. The foregoing storage medium includes various mediums that can store program code, such as a U disk, a mobile hard disk, a read-only memory (ROM), a random access memory (RAM), a magnetic disk, or an optical disk, and the like.

The foregoing is only specific implementation of the present application, but the protection scope of the present application is not limited thereto, and any change or substitution that can be easily conceived by those skilled in the art within the technical scope disclosed by the present application should be covered within the protection scope of the present application. Therefore, the protection scope of the present application should be subjected to the protection scope of the claims.

What is claimed is:

1. A method for multiplexing uplink grant resources, comprising:

determining, by a network device, control information, wherein the control information comprises uplink grant resources information, wherein, the uplink grant resources information is used for indicating uplink grant resources configured by the network device for a terminal device, the control information is used for the terminal device to determine a multiplexing manner of remaining uplink grant resources, wherein the remaining uplink grant resources are uplink grant resources in the uplink grant resources except a part of uplink grant resources used for carrying data in one or more logical channels corresponding to the uplink grant resources, and the uplink grant resources correspond to a first numerology; and transmitting, by the network device, the control information to the terminal device, wherein the multiplexing manner is a partial logical channel multiplexing manner, wherein the partial logical channel multiplexing manner is that a logical channel multiplexing the remaining uplink grant resources is a logical channel corresponding to the first numerology.

2. The method according to claim 1, wherein, before the determining, by a network device, control information, the method further comprises:

receiving, by the network device, a resource scheduling request transmitted by the terminal device, wherein the resource scheduling request is used for indicating a data amount of data to be transmitted of the terminal device and a logical channel carrying the data to be transmitted; and determining, by the network device, the uplink grant resources according to the data amount and a service feature of the logical channel carrying the data to be transmitted.

3. The method according to claim 1, wherein, the multiplexing manner comprises at least one of the following manners: a global logical channel multiplexing manner and an undefined logical channel multiplexing manner.

4. The method according to claim 1, wherein, the method further comprises:

transmitting, by the network device, priority indication information to the terminal device, wherein the priority indication information is used for the terminal device to determine a priority for each logical channel of a target logical channel to multiplex the remaining uplink grant resources, and the target logical channel is a logical channel that can multiplex the remaining uplink grant resources, and wherein the priority indication information is also used for the terminal device to determine priorities that different data packets in the each logical channel multiplex the remaining uplink grant resources.

5. The method according to claim 4, wherein, the priority indication information is used for indicating that the terminal device determines the priority for the each logical channel to multiplex the remaining uplink grant resources according to a service type of data that can be transmitted by a data radio bearer (DRB) corresponding to the each logical channel; or, the priority indication information is used for indicating that the terminal device determines the priority for the each logical channel to multiplex the remaining uplink grant resources according to a parameter configured by high layer signaling; or, the priority indication information is used for indicating the priority for the each logical channel to multiplex the remaining uplink grant resources.

6. A method for multiplexing uplink grant resources, comprising:

receiving, by a terminal device, control information transmitted by a network device, wherein the control information comprises uplink grant resources information, the uplink grant resources information is used for indicating uplink grant resources configured by the network device for the terminal device, and the control information is used for the terminal device to determine a multiplexing manner of remaining uplink grant resources;

determining, by the terminal device, a multiplexing manner of the remaining uplink grant resources, wherein the remaining uplink grant resources are uplink grant resources in the uplink grant resources except a part of uplink grant resources used for carrying data in one or more logical channels corresponding to the uplink grant resources, and the uplink grant resources correspond to a first numerology; and multiplexing, by the terminal device, the remaining uplink grant resources according to the multiplexing manner;

wherein the multiplexing manner is a partial logical channel multiplexing manner, wherein the partial logical channel multiplexing manner is that a logical channel multiplexing the remaining uplink grant resources is a logical channel corresponding to the first numerology.

7. The method according to claim 6, wherein, the uplink grant resources correspond to one or more logical channels used for carrying data to be transmitted;

the remaining uplink grant resources comprises resources that does not fill up the data to be transmitted in the uplink grant resources.

8. The method according to claim 6, wherein, the method further comprises:

transmitting, by the terminal device, a resource scheduling request to the network device before receiving the control information, wherein the resource scheduling request is used for indicating a data amount of data to be transmitted of the terminal device and a logical channel carrying the data to be transmitted.

9. The method according to claim 6, wherein, the determining, by the terminal device, a multiplexing manner of remaining uplink grant resources comprises:

determining, by the terminal device, a multiplexing manner of the remaining uplink grant resources according to the control information.

10. The method according to claim 6, wherein, the multiplexing manner comprises at least one of the following manners: a global logical channel multiplexing manner and an undefined logical channel multiplexing manner.

11. The method according to claim 10, wherein, the global logical channel multiplexing manner comprises multiplexing the remaining uplink grant resources for all logical channels with a service carried thereon according to a specific priority order.

12. The method according to claim 10, wherein, the multiplexing, by the terminal device, the remaining uplink grant resources according to the multiplexing manner comprises:

determining, by the terminal device, one or more target logical channels according to the multiplexing manner, wherein the target logical channel is a logical channel that can multiplex the remaining uplink grant resources;

determining, by the terminal device, a priority for each logical channel of the target logical channel to multiplex the remaining uplink grant resources; and multiplexing, by the terminal device, the remaining uplink grant resources according to the priority for the each logical channel to multiplex the remaining uplink grant resources.

13. The method according to claim 12, wherein, the method further comprises:

receiving, by the terminal device, priority indication information transmitted by the network device, wherein the priority indication information is used for the terminal device to determine the priority for the each logical channel to multiplex the remaining uplink grant resources;

wherein, the determining, by the terminal device, a priority for each channel of the target logical channel to multiplex the remaining uplink grant resources comprises:

determining, by the terminal device, the priority for the each logical channel to multiplex the remaining uplink grant resources according to the priority indication information.

14. The method according to claim 13, wherein, the priority indication information is used for indicating that the terminal device determines the priority for the each logical channel to multiplex the remaining uplink grant resources according to a service type of data that can be transmitted by a data radio bearer (DRB) corresponding to the each logical channel; or, the priority indication information is used for indicating that the terminal device determines the priority for the each logical channel to multiplex the remaining uplink grant resources according to a parameter configured by high layer signaling; or, the priority indication information is used for indicating the priority for the each logical channel to multiplex the remaining uplink grant resources.

15. The method according to claim 14, wherein, the parameter configured by the high layer signaling comprises at least one of the following parameters: a priority level, a prioritized bit rate (PBR) and a bucket size duration (BSD).

16. A network device, comprising:

a processor, configured to determine control information, wherein the control information comprises uplink grant resources information, wherein, the uplink grant resources information is used for indicating uplink grant resources configured by the network device for a terminal device, the control information is used for a terminal device to determine a multiplexing manner of remaining uplink grant resources, the remaining uplink grant resources are uplink grant resources in the uplink grant resources except a part of uplink grant resources used for carrying data in one or more logical channels corresponding to the uplink grant resources, and the uplink grant resources correspond to a first numerology; and a transceiver, configured to transmit the control information to the terminal device;

wherein the multiplexing manner is a partial logical channel multiplexing manner, wherein the partial logical channel multiplexing manner is that a logical channel multiplexing the remaining uplink grant resources is a logical channel corresponding to the first numerology.

17. The network device according to claim 16, wherein, before the processor determines control information, the transceiver is further configured to:

receive a resource scheduling request transmitted by the terminal device, wherein the resource scheduling request is used for indicating a data amount of data to be transmitted of the terminal device and a logical channel carrying the data to be transmitted; and the processor is specifically configured to determine the uplink grant resources according to the data amount and a service feature of the logical channel carrying the data to be transmitted.

18. The network device according to claim 16, wherein, the multiplexing manner comprises at least one of the following manners: a global logical channel multiplexing manner and an undefined logical channel multiplexing manner.

19. The network device according to claim 16, wherein, the transceiver is further configured to:

transmit priority indication information to the terminal device, wherein the priority indication information is used for the terminal device to determine a priority for each logical channel of a target logical channel to multiplex the remaining uplink grant resources, wherein the target logical channel is a logical channel that can multiplex the remaining uplink grant resources.

20. The network device according to claim 19, wherein, the priority indication information is also used for the terminal device to determine priorities that different data packets in the each logical channel multiplex the remaining uplink grant resources.

21. The network device according to claim 20, wherein, the priority indication information is used for indicating that the terminal device determines the priority for the each logical channel to multiplex the remaining uplink grant resources according to a parameter configured by high layer signaling, and wherein the parameter configured by the high layer signaling comprises at least one of the following parameters: a priority level, a prioritized bit rate (PBR) and a bucket size duration (BSD).

22. A terminal device, comprising:

a transceiver, configured to receive control information transmitted by a network device, wherein the control information comprises uplink grant resources information, and the uplink grant resources information is used for indicating uplink grant resources configured by the network device for the terminal device, and the control information is used for the terminal device to determine a multiplexing manner of remaining uplink grant resources;

a processor, configured to determine a multiplexing manner of the remaining uplink grant resources, wherein the remaining uplink grant resources are uplink grant resources in the uplink grant resources except a part of uplink grant resources used for carrying data in one or more logical channels corresponding to the uplink grant resources, and the uplink grant resources correspond to a first numerology; and the processor, further configured to multiplex the remaining uplink grant resources according to the multiplexing manner;

wherein the multiplexing manner is a partial logical channel multiplexing manner, wherein the partial logical channel multiplexing manner is that a logical channel multiplexing the remaining uplink grant resources is a logical channel corresponding to the first numerology.

23. The terminal device according to claim 22, wherein, the processor is specifically configured to:

determine a multiplexing manner of the remaining uplink grant resources according to the control information.

24. The terminal device according to claim 22, wherein, the multiplexing manner comprises at least one of the following manners: a global logical channel multiplexing manner and an undefined logical channel multiplexing manner.

25. The terminal device according to claim 24, wherein, the processor is specifically configured to:

determine one or more target logical channels according to the multiplexing manner, wherein the target logical channel is a logical channel that can multiplex the remaining uplink grant resources;

determine a priority for each logical channel of the target logical channel to multiplex the remaining uplink grant resources; and multiplex the remaining uplink grant resources according to the priority for the each logical channel to multiplex the remaining uplink grant resources.

26. The terminal device according to claim 25, wherein, the transceiver is further configured to:

receive priority indication information transmitted by the network device, wherein the priority indication information is used for the terminal device to determine the priority for the each logical channel to multiplex the remaining uplink grant resources;

wherein, the processor is specifically configured to:
determine the priority for the each logical channel to multiplex the remaining uplink grant resources according to the priority indication information.

27. The terminal device according to claim 26, wherein, the priority indication information is also used for the terminal device to determine priorities that different data packets in the each logical channel multiplex the remaining uplink grant resources, the processor is specifically configured to:
determine the priorities that different data packets in the each logical channel multiplex the remaining uplink grant resources according to the priority indication information; and
multiplex the remaining uplink grant resources according to the priority for the each logical channel to multiplex the remaining uplink grant resources and the priorities that different data packets in the each logical channel multiplex the remaining uplink grant resources.

28. The terminal device according to claim 26, wherein, the priority indication information is used for indicating that the terminal device determines the priority for the each logical channel to multiplex the remaining uplink grant resources according to a service type of data that can be transmitted by a data radio bearer (DRB) corresponding to the each logical channel; or, the priority indication information is used for indicating that the terminal device determines the priority for the each logical channel to multiplex the remaining uplink grant resources according to a parameter configured by high layer signaling; or, the priority indication information is used for indicating the priority for the each logical channel to multiplex the remaining uplink grant resources.

29. The terminal device according to claim 28, wherein, the parameter configured by the high layer signaling comprises at least one of the following parameters: a priority level, a prioritized bit rate (PBR) and a bucket size duration (BSD).

* * * * *